Sept. 28, 1926.

R. R. DAMERON

TOOL KIT

Filed August 6, 1925

1,600,977

R. R. Dameron
Inventor

By C.A.Snow &Co.
Attorneys.

Patented Sept. 28, 1926.

1,600,977

UNITED STATES PATENT OFFICE.

ROBERT RAYMOND DAMERON, OF TULSA, OKLAHOMA.

TOOL KIT.

Application filed August 6, 1925. Serial No. 48,573.

By way of explanation, it may be stated that it is the common practice to stow automobile tools beneath the front seat cushion in the vehicle. The result is that, when access to the tools is desired, the front seat cushion has to be lifted, to the inconvenience of an operator.

The foregoing being understood, this invention aims to provide novel means whereby tools and other supplies, housed within the seat of an automobile, may be rendered accessible.

It is within the province of the disclosure to improve generally and to enhance the utility of devices of that sort to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1:
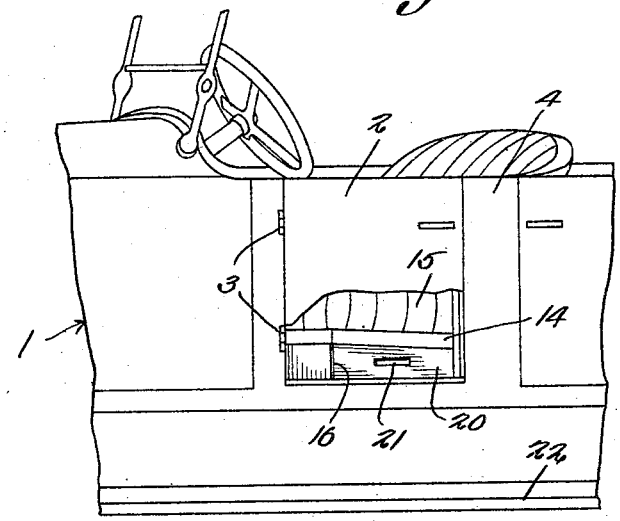
Figure 2:
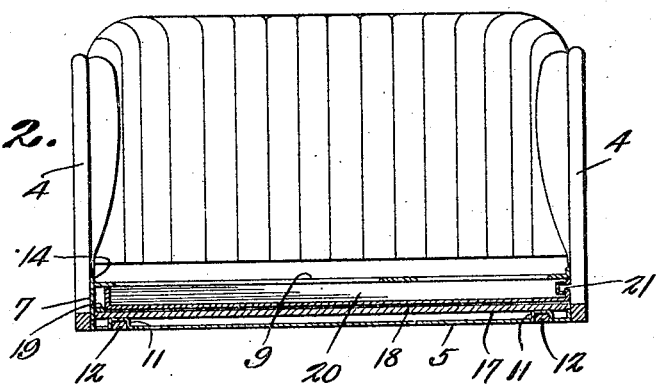
Figure 3:
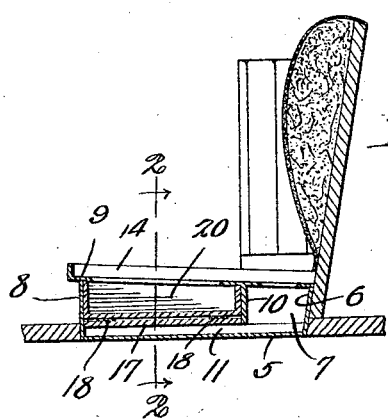

Figure 1 shows in side elevation, a portion of an automobile whereunto the device forming the subject matter of this application has been applied; Figure 2 is a transverse section; Figure 3 is a section about at right angles to the showing of Figure 2, the line 2—2 in Figure 3 indicating the cutting plane in Figure 2.

The device forming the subject matter of this application is adapted to be used on widely different forms of automobiles, but, since one form must be shown, and by way of illustration, there appears in the drawings, a motor car 1, the door 2 of which is hingedly mounted at 3 on one of the side walls 4 of the car.

The seat support sometimes includes a bottom 5, a back 6, ends 7, a front 8, a top 9 having openings, and a partition 10 extended between the ends 7, the bottom 5 having ribs 11 which receive a part of the framework 12 of the car, the top 9 being supplied with an upstanding flange 14 within which the front seat cushion 15 is seated on the top 9. At present, tools and automobile supplies are housed beneath the seat cushion 15, and it is obvious that the seat cushion must be removed in order to give access to the tools.

The end of the seat support is exposed, when the door 2 is opened, and in one end of the seat support, an opening 16 is fashioned, a panel 17 being inserted through the opening 16 and resting on the ribs 11, the panel being prevented from moving endwise by the ends 7 of the seat support, and being prevented from moving crosswise by the front 8 of the seat support and by the partition 10, assuming that the partition is present. The panel 17 has transversely spaced upstanding longitudinal ribs 18, and at the inner ends of the ribs 18, a transverse stop 19 is mounted on the panel. A drawer 20 is slidable in the opening 16, upon the ribs 18, the said ribs facilitating the sliding movement of the drawer. The stop 19 limits the inward movement of the drawer, with the outer end of the drawer flush with that end 7 of the seat support wherein the opening 16 is formed. The drawer 20 has a recessed handle 21. The drawer 20 may be arranged in any desired way, depending upon the tools or the like which are to be carried in the drawer. The door 2 holds the drawer 20 closed, and when the door 2 is opened, the drawer may be pulled out, and the operator may spread his tools out, if he wishes, upon the running board 22 of the car.

Having thus described the invention, what is claimed is:—

1. The combination with a vehicle having an entrance opening and a seat support one end of which is exposed through the opening, of a drawer located within the seat support and slidable in said end of the seat support, the drawer being accessible through the opening, and a removable panel within the seat support, the panel being provided with a stop limiting the inward movement of the drawer, and being provided with longitudinal ribs whereon the drawer slides.

2. The combination with a vehicle having an entrance opening and a seat support one end of which is exposed through the opening, of a drawer located within the seat support and slidable in said end of the seat support, the drawer being accessible through the opening, and a movable closure for the entrance opening, the closure coacting with the drawer to limit the outward movement of the drawer, and a removable panel within the seat support, the panel having a stop which limits the inward movement of the drawer, and being provided with longitudinal ribs whereon the drawer slides.

In testimony that I claim the foregoing as my own, I have hereto affixed my signature.

ROBERT RAYMOND DAMERON.